US008477879B2

(12) United States Patent
Oettinger et al.

(10) Patent No.: US 8,477,879 B2
(45) Date of Patent: Jul. 2, 2013

(54) SYSTEM AND METHOD FOR BI-PHASE MODULATION DECODING

(75) Inventors: Eric Gregory Oettinger, Rochester, MN (US); Mark David Hagen, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 347 days.

(21) Appl. No.: 12/832,674

(22) Filed: Jul. 8, 2010

(65) Prior Publication Data

US 2011/0150106 A1    Jun. 23, 2011

Related U.S. Application Data

(60) Provisional application No. 61/289,825, filed on Dec. 23, 2009.

(51) Int. Cl.
*H04L 25/03*    (2006.01)
(52) U.S. Cl.
USPC ........................................... 375/333
(58) Field of Classification Search
USPC .......... 363/21.1; 370/331, 342, 479; 375/242, 375/257, 316, 333, 361, 371; 455/423, 439, 455/517, 525, 561; 607/60; 714/795
See application file for complete search history.

(56) References Cited

U.S. PATENT DOCUMENTS

| 2001/0050965 | A1 | 12/2001 | Kaewell, Jr. |
| 2004/0218702 | A1* | 11/2004 | Denk ............................ 375/350 |
| 2004/0239487 | A1* | 12/2004 | Hershbarger ............ 340/310.07 |
| 2006/0126762 | A1 | 6/2006 | Tapucu et al. |
| 2007/0172007 | A1 | 7/2007 | Shoarinejad et al. |
| 2008/0208291 | A1* | 8/2008 | Leyde et al. .................... 607/60 |
| 2009/0028279 | A1* | 1/2009 | Kitta ............................ 375/371 |

OTHER PUBLICATIONS

PCT Search Report mailed Mar. 29, 2011.

\* cited by examiner

*Primary Examiner* — Sam K Ahn
*Assistant Examiner* — Shawkat M Ali
(74) *Attorney, Agent, or Firm* — William B. Kempler; Wade J. Brady, III; Frederick J. Telecky, Jr.

(57) ABSTRACT

One embodiment of the present invention includes a decoder system that decodes a bi-phase modulated signal to generate an output code. The system includes a first filter associated with a first logic state configured to generate a first dot product of a plurality of consecutive digital samples of the bi-phase modulated signal and a respective plurality of tap weights of the first filter. The system also includes a second filter associated with a second logic state configured to generate a second dot product of the plurality of consecutive digital samples of the bi-phase modulated signal with a respective plurality of tap weights of the second filter. The system further includes a comparator configured to compare the first and second dot products and to provide the output code as a bit having one of the first logic state and the second logic state based on the comparison.

17 Claims, 3 Drawing Sheets

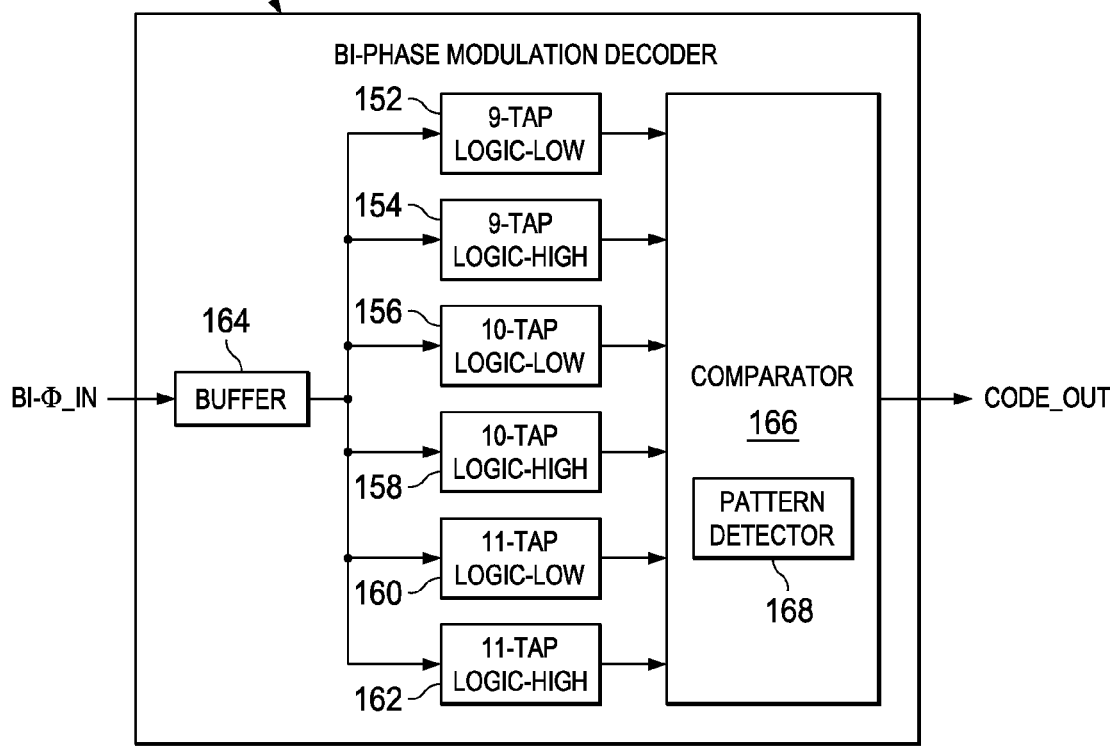
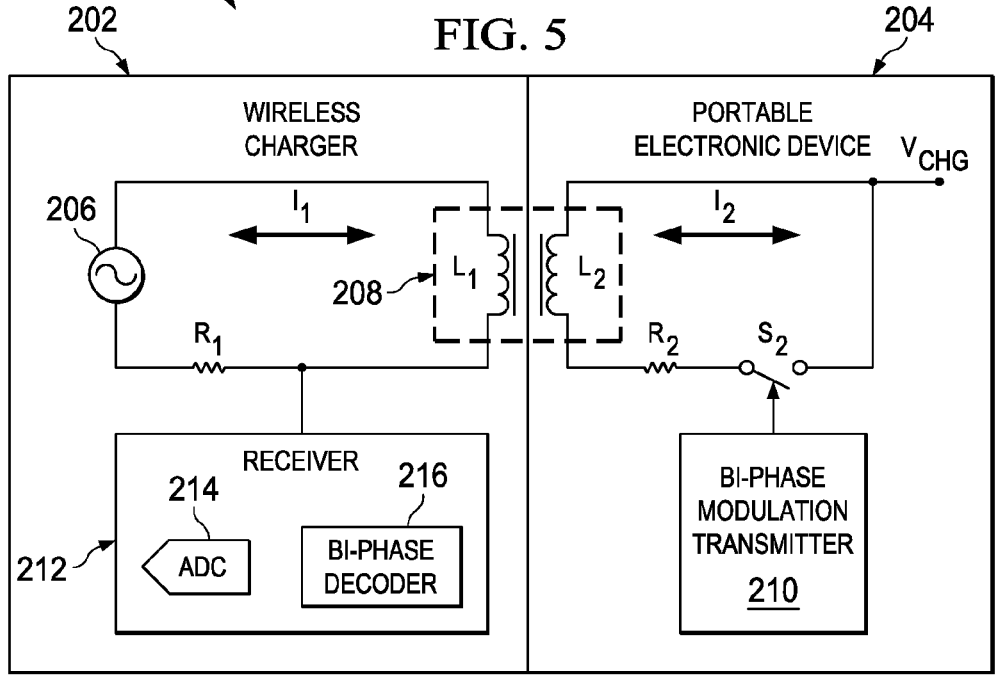

SYSTEM AND METHOD FOR BI-PHASE MODULATION DECODING

RELATED APPLICATIONS

The present invention claims priority from U.S. Provisional Patent Application No. 61/289,825, filed Dec. 23, 2009.

TECHNICAL FIELD

The present invention relates generally to communications, and specifically to a system and method for bi-phase modulation decoding.

BACKGROUND

One example of a coding scheme that can be utilized for transferring data is bi-phase modulation. Each bit-window (i.e., period) of a bi-phase modulated signal represents a single logic bit, with each bit-window beginning with a logic state transition. A logic-low is represented by a substantially constant logic state through the bit-window, whereas a logic-high is represented by an additional logic state transition in the approximate center of the bit-window.

When the amplitude of a bi-phase modulated signal is sufficient, any of a variety of different decoding algorithms can be implemented to decode the bi-phase modulated signal. However, as the amplitude of the signal decreases, such as due to filtering and/or transmission medium losses, decoding the bi-phase modulated signal can be difficult based on noise being more likely to appear as valid logic transitions. In addition, in some bi-phase modulated signal transmission implementations, there may be no external clock to align the phase and/or frequency of the bi-phase modulated signal, which can further complicate decoding of the bi-phase modulated signal. Furthermore, when a bi-phase modulated signal is low-pass filtered, such as to remove a carrier frequency, the amplitude of logic-high codes can be attenuated more than logic-low codes that are half the frequency of the logic-high codes.

SUMMARY

One embodiment of the present invention includes a decoder system that decodes a bi-phase modulated signal to generate an output code. The system includes a first filter associated with a first logic state configured to generate a first statistical value of a plurality of consecutive digital samples of the bi-phase modulated signal relative to a respective plurality of tap weights of the first filter. The system also includes a second filter associated with a second logic state configured to generate a second statistical value of the plurality of consecutive digital samples of the bi-phase modulated signal relative to a respective plurality of tap weights of the second filter. The system further includes a comparator configured to compare the first and second statistical values and to provide the output code as a bit having one of the first logic state and the second logic state based on the comparison.

Another embodiment of the present invention includes a method for decoding a bi-phase modulated signal. The method includes receiving the bi-phase modulated signal via a transmission medium and converting the bi-phase modulated signal from an analog to a digital form comprising a plurality of consecutive digital samples. The method also includes generating a first dot product of the plurality of consecutive digital samples and a respective plurality of tap weights of a first finite impulse response filter associated with a first logic state and generating a second dot product of the plurality of consecutive digital samples and a respective plurality of tap weights of a second finite impulse response filter associated with a second logic state. The method further includes comparing an absolute value of the first dot product and an absolute value of the second dot product and generating an output code as a bit having the first logic state upon the absolute value of the first dot product being greater than the absolute value of the second dot product and having the second logic state upon the absolute value of the second dot product being greater than the absolute value of the first dot product.

Another embodiment of the present invention includes a wireless power system. The system includes a portable electronic device comprising a transmitter configured to modulate a bi-phase communication signal onto a secondary current associated with a secondary inductor. The system also includes a wireless charger comprising a receiver configured to monitor a primary current associated with a primary inductor. The primary inductor and secondary inductor collectively form an isolation transformer configured to transfer energy from the primary inductor to the secondary inductor to generate a voltage in the portable electronic device. The receiver includes a decoder that includes at least one first filter associated with a first logic state that are each configured to generate a dot product of a plurality of consecutive digital samples of the bi-phase modulated signal associated with the primary current and tap weights associated with a distinct plurality of taps associated with each respective one of the at least one first filter. The decoder also includes at least one second filter associated with a second logic state that are each configured to generate a dot product of the plurality of consecutive digital samples of the bi-phase modulated signal associated with the primary current and tap weights associated with a distinct plurality of taps associated with each respective one of the at least one second filter. The decoder further includes a comparator configured to compare the dot products associated with each of the at least one first filter and the at least one second filter to provide the output code as a bit having one of the first logic state and the second logic state based on the comparison.

BRIEF DESCRIPTION OF THE DRAWINGS

FIG. 4 illustrates an example of a bi-phase modulation decoder system in accordance with an aspect of the invention.

FIG. 5 illustrates an example of a wireless power system in accordance with an aspect of the invention.

DETAILED DESCRIPTION

Figure 1:
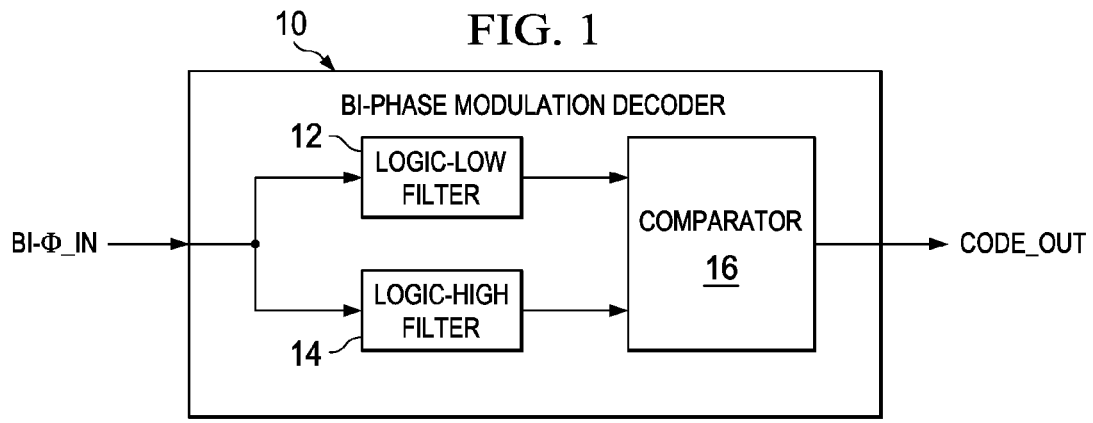
FIG. 1 illustrates an example of a bi-phase modulation decoder in accordance with an aspect of the invention.

The present invention relates generally to communications, and specifically to a system and method for bi-phase modulation decoding. A bi-phase modulation decoder can include at least one filter that is associated with the logic-low state, at least one filter that is associated with the logic-high state, and a comparator. As an example, the filters can be finite impulse response (FIR) filters. A bi-phase modulated signal having a plurality of digital samples can be provided to each of the filters associated with each of the logic-low and logic-high states. The filters can be programmed with a plurality of taps that have tap weights with a range of values that are normalized with respect to each other. As an example, the values can be integer or floating point values. The filters can thus each generate a statistical value, such as a dot product, of the digital samples of the bi-phase modulated signal with respect to the plurality of taps. The comparator can thus compare an absolute value of the dot products that are generated by the filters to determine if a given bi-phase modulated code corresponds to a logic-low or a logic-high.

The range of values associated with the tap weights of the plurality of taps for a given filter can be programmed with specific values that result in a dot product that is more indicative of a logic state that is specific to the filter. As an example, filters that are associated with a logic-low can be programmed such that the tap weights have a range of values that can be plotted as an approximate half sine wave across the taps of the filters, such that the values can all be greater than a reference value (e.g., zero). Therefore, an absolute value of a dot product of a logic-low coded bi-phase modulated signal can be much greater in the logic-low filter than a logic-high coded bi-phase modulated signal.

As another example, filters that are associated with a logic-high can be programmed such that the tap weights have a range of values that can be plotted as an approximate sine wave across the plurality of taps of the filters. Specifically, the values for the filter associated with the logic-high can have a first portion of taps corresponding to consecutive digital samples with values greater than the reference value and a second portion of taps corresponding to consecutive digital samples with values less than the reference value. Accordingly, an absolute value of a dot product of a logic-high coded bi-phase modulated signal can be much greater in the logic-high filter than a logic-low coded bi-phase modulated signal.

The bi-phase modulation decoder can include additional filters associated with each of the logic states with distinct numbers of taps. For example, for each logic state, the bi-phase modulation decoder can include a first filter having a number N of taps, where N is a positive corresponding to an expected number of digital samples of the bi-phase modulation decoder, a second filter having N+1 taps, and a third filter having N−1 taps. The tap weights of the six filters can be programmed to be normalized relative to each other. Therefore, the bi-phase modulation decoder can not only determine the code of the bi-phase modulated signal, but can also detect and account for frequency variation and jitter present in the bi-phase modulated signal. Specifically, the filter having the highest absolute value dot product not only determines the code of the bi-phase modulated signal, but also determines the number of samples of a given bit-window of the bi-phase modulated signal, and thus a frequency variation of the bi-phase modulated signal. As a result, the bi-phase modulation decoder can select two of the filters having the appropriate number of taps that correspond to the number of digital samples of a bit-window for subsequent decoding of the bi-phase modulated signal.

FIG. 1 illustrates a bi-phase modulation decoder 10 in accordance with an aspect of the invention. The bi-phase modulation decoder 10 is configured to receive a bi-phase modulated signal BI-Φ_IN and to decode the bi-phase modulated signal BI-Φ_IN to generate an output code CODE_OUT. Each bit-window of the bi-phase modulated signal BI-Φ_IN can represent a single logic bit, with each bit-window beginning with a logic state transition. A logic-low can be represented by a substantially constant logic state through the bit-window, whereas a logic-high can be represented by an additional logic state transition in the approximate center of the bit-window. The bi-phase modulation decoder 10 can be implemented in any of a variety of electronic communications applications. As an example, the bi-phase modulation decoder 10 can be included in a receiver in a wireless power application.

The bi-phase modulated decoder 10 includes a logic-low filter 12 corresponding to a logic-low, a logic-high filter 14 corresponding to a logic-high, and a comparator 16. As an example, the logic-low filter 12 and the logic-high filter 14 can be configured as finite impulse response (FIR) filters. In the example of FIG. 1, the bi-phase modulated signal BI-Φ_IN is provided to both of the logic-low filter 12 and the logic-high filter 14. For a given bit-window of the bi-phase modulated signal BI-Φ_IN, the logic-low filter 12 and the logic-high filter 14 each generate a statistical value, such as a dot product, of digital samples of the bi-phase modulated signal BI-Φ_IN relative to a respective plurality of tap weights of the respective one of the logic-low filter 12 and the logic-high filter 14. The digital samples of the bi-phase modulated signal BI-Φ_IN can be received at each of the logic-low filter 12 and the logic-high filter 14 at a substantially constant frequency. As an example, the digital samples of the bi-phase modulated signal BI-Φ_IN can be buffered, such that the bi-phase modulation decoder 10 can decode each bit-window of the bi-phase modulated signal BI-Φ_IN as they are received. The logic-low filter 12 and the logic-high filter 14 each provide the respective dot products to the comparator 16, which compares an absolute value magnitude of each of the dot products to determine if the given bit-window of the bi-phase modulated signal BI-Φ_IN corresponds to a logic-low code or a logic-high code.

As described above, a bit-window of the bi-phase modulated signal BI-Φ_IN that is coded with a logic-low state can have an approximately constant magnitude (i.e., high or low) across the entire bit-window, and a bit-window of the bi-phase modulated signal BI-Φ_IN that is coded with a logic-high state can have an additional logic-state transition in the approximate center of the bit-window. Because the bi-phase modulated signal BI-Φ_IN can be low-pass filtered prior to being received at the bi-phase modulation decoder 10, the logic state transitions of the bi-phase modulated signal BI-Φ_IN can be gradual. Therefore, a bit-window of the bi-phase modulated signal BI-Φ_IN that is coded with a logic-low state can resemble an approximate half sine wave and a bit-window of the bi-phase modulated signal BI-Φ_IN that is coded with a logic-high state can resemble an approximate sine wave. Therefore, each of the logic-low filter 12 and the logic-high filter 14 can include a plurality of taps that are programmed with tap weights having values that can be plotted to correspond to the respective coded logic state of a bit-window of the bi-phase modulated signal BI-Φ_IN. As an example, the values can be integer values or floating point values.

For example, the tap weights of the logic-low filter 12 can be programmed with a range of values that can be plotted as an approximate half sine wave across the plurality of taps of the logic-low filter 12, such that the values can all be greater than a reference value (e.g., zero). As another example, the logic-high filter 14 can be programmed such that the tap weights have a range of values that can be plotted as an approximate sine wave across the plurality of taps of the logic-high filter 14. Specifically, the values for the logic-high filter 14 can have a first portion of taps corresponding to consecutive digital samples with values greater than the reference value and a second portion of taps corresponding to consecutive digital samples with values less than the reference value. It is to be understood that, for the logic-high filter 14, the sine wave can be plotted with a phase of 0° or 180°, such that the portions of the taps that are greater than and less than the reference value, respectively, can be reversed.

Figure 2:
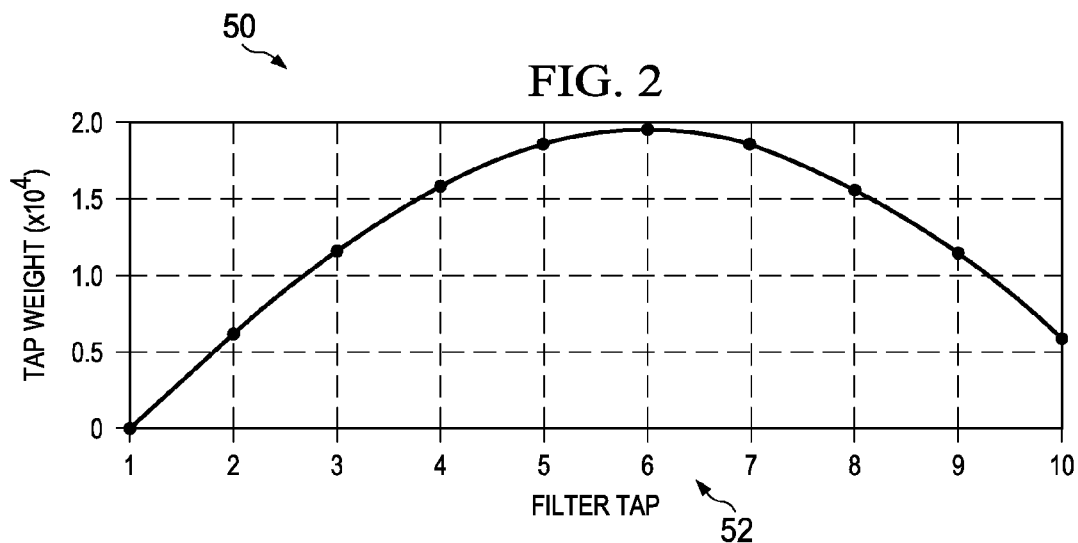
FIG. 2 illustrates an example of a graph of a set of filter taps in accordance with an aspect of the invention.

FIG. 2 illustrates an example of a graph 50 of a set of filter taps 52 in accordance with an aspect of the invention. As an example, the filter taps 52 can be filter taps associated with the logic-low filter 12 in the example of FIG. 1. The graph 50 is demonstrated in the example of FIG. 2 as plotting tap weights across ten filter taps 52, numbered 1 through 10 in the example of FIG. 2. Similar to as described above, the tap weights of the logic-low filter 12 are demonstrated as being plotted as an approximate half sine wave across the filter taps 52, with the tap weights of all of the filter taps 52 having a magnitude that is greater than a reference value of 0. In the example of FIG. 2, the filter taps are demonstrated as having been programmed with a set of integer tap weights that are approximately represented as {0, 6180, 11756, 16180, 19021, 20000, 19021, 16180, 11756, 6180}. It is to be understood that, in the example of FIG. 2, the tap weights are demonstrated as interconnected by lines to demonstrate the plotting of the tap weights as an approximate half sine wave.

Figure 3:
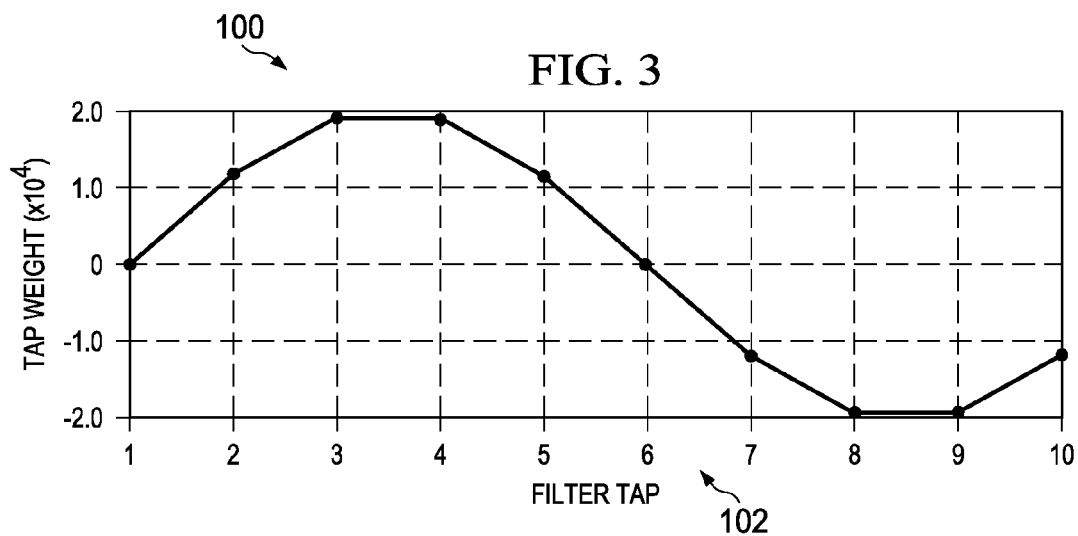
FIG. 3 illustrates another example of a graph of a set of filter taps in accordance with an aspect of the invention.

FIG. 3 illustrates an example of a graph 100 of a set of filter taps 102 in accordance with an aspect of the invention. As an example, the filter taps 102 can be filter taps associated with the logic-high filter 14 in the example of FIG. 1. The graph 100 is demonstrated in the example of FIG. 3 as plotting tap weights across ten filter taps 102, numbered 1 through 10 in the example of FIG. 3. Similar to as described above, the tap weights of the logic-high filter 14 are demonstrated as being plotted as an approximate sine wave across the filter taps 102. Specifically, the tap weights of a first portion of the filter taps 102 numbered 2 through 5 have a value that is greater than the reference value of 0, and the tap weights of a second portion of the filter taps 102 numbered 7 through 10 have a value that is less than the reference value of 0 and which are equal and opposite the first portion. In the example of FIG. 3, the filter taps are demonstrated as having been programmed with a set of tap weights that are approximately represented as {0, 11756, 19021, 19021, 11756, 0, −11756, −19021, −19021, −11756}. It is to be understood that, in the example of FIG. 3, the tap weights are demonstrated as interconnected by lines to demonstrate the plotting of the tap weights as an approximate sine wave. In addition, as demonstrated by the range of tap weight values in the graph 100 relative to the graph 50, the tap weights for each of the logic-low filter 12 and the logic-high filter 14 are normalized with respect to each other to provide comparable dot products to the comparator 16.

Referring back to the example of FIG. 1, the logic-low filter 12 and the logic-high filter 14 each generate a dot product of digital samples of the bi-phase modulated signal BI-Φ_IN and the tap weights 52 and 102, respectively. To generate the dot product, each consecutive digital sample of the bi-phase modulated signal BI-Φ_IN is multiplied by the respective consecutive filter taps 52 and 102, with all of the products being summed together. Therefore, for each bit-window of the bi-phase modulated signal BI-Φ_IN, the comparator 16 receives the respective dot products being provided by the logic-low filter 12 and the logic-high filter 14. Based on the programmed tap weights for the taps 52 and 102, the dot product that is generated by the given one of the logic-low filter 12 and the logic-high filter 14 that corresponds to the encoded logic state of the bit-window of the bi-phase modulated signal BI-Φ_IN will have an absolute value that is much greater than the other one of the logic-low filter 12 and the logic high filter 14. Accordingly, the comparator 16 can easily identify and output the encoded logic state of the bit-window of the bi-phase modulated signal BI-Φ_IN as the digital output signal CODE_OUT based on a simple determination of which of the dot products output from the logic-low filter 12 and the logic-high filter 14 has a greater absolute value.

As an example, the bi-phase modulated signal BI-Φ_IN can have a frequency of 2 kHz and can be sampled at a frequency of 20 kHz by an analog-to-digital converter (ADC; not shown). Thus, the bi-phase modulation decoder 10 receives ten digital samples of the bi-phase modulated signal BI-Φ_IN corresponding to a single bit-window, and thus an encoded logic state. For example, the ten digital samples are numerically represented as the set {162, 646, 594, 670, −23, −642, −778, −804, −674, −280}. The digital samples are provided to each of the logic-low filter 12 and the logic-high filter 14, and each of the logic-low filter 12 and the logic-high filter 14 generate a dot product of the ten digital samples and the respective set of tap weights of the taps 52 and 102. Based on the tap weights for the taps 52 and 102 demonstrated in the examples of FIGS. 2 and 3, respectively, the logic-low filter 12 generates an absolute value dot product of 28,922,541 and the logic-high filter 14 generates an absolute value dot product of 71,917,418. Therefore, the comparator 16 determines that the ten digital samples of the bi-phase modulated signal BI-Φ_IN correspond to a logic-high based on the absolute value of the dot product generated by the logic-high filter 14 being greater than the dot product being generated by the logic-low filter 12. Accordingly, the comparator 16 outputs the signal CODE_OUT as a logic-high.

The bi-phase modulation decoder 10 is therefore capable of accurately decoding the bi-phase modulation signal BI-Φ_IN, regardless of an attenuated amplitude that can result from filtering and/or transmission medium losses. Specifically, even at very low amplitudes, such that noise could typically degrade accurate decoding of the bi-phase modulated signal BI-Φ_IN, the bi-phase modulation decoder 10 can still accurately decode the bi-phase modulated signal BI-Φ_IN based on the operation of the logic-low filter 12, the logic-high filter 14, and the comparator 16. In addition, the bi-phase modulation decoder 10 can accurately decode the bi-phase phase modulated signal BI-Φ_IN even in the presence of a direct current (DC) component of the bi-phase modulated signal BI-Φ_IN based on the simple comparison operation of the comparator 16. Furthermore, the weighting provided by the tap values of the taps 52 and 102 of the logic-low filter 12 and the logic-high filter 14, respectively, provides better signal-to-noise ratio (SNR) than simple zero-crossing detection algorithms for decoding the bi-phase modulated signal BI-Φ_IN that is subjected to noise and/or asymmetry.

It is to be understood that the bi-phase modulation decoder 10 is not intended to be limited to the examples of FIGS. 1 through 3. For example, because the bi-phase modulation decoder 10 operates in the digital domain, the bi-phase modulation decoder 10 can be implemented as software or a combination of hardware and software. Specifically, the bi-phase modulation decoder 10 can be configured in or in a portion of an integrated circuit (IC). As another example, the logic-low and logic-high filters 12 and 14 are not limited to generating a dot product, but other types of statistical values that associate the digital samples of the bi-phase modulated signal BI-Φ_IN with the taps of the logic-low and logic-high filters 12 and 14 can be implemented. Furthermore, it is to be understood that the tap weights for the taps 52 and 102 are not intended to be limited to the range of values demonstrated in the examples of FIGS. 2 and 3, respectively. For example, the tap weights for the taps 52 and 102 could instead more closely resemble square waves as opposed to the more gradual changes in values between taps 52 and 102 demonstrated in the examples of FIGS. 2 and 3, or could instead have inverted magnitudes relative to the common reference value of zero. Therefore, the bi-phase modulation decoder 10 can be configured in any of a variety of ways.

FIG. 4 illustrates another example of a bi-phase modulation decoder 150 in accordance with an aspect of the invention. Similar to the bi-phase modulation decoder 10 in the example of FIG. 1, the bi-phase modulation decoder 150 is configured to receive digital samples of the bi-phase modulated signal BI-Φ_IN and to decode the bi-phase modulated signal BI-Φ_IN to generate an output code CODE_OUT.

The bi-phase modulation decoder 150 includes a plurality of logic-low filters that each have a distinct number of taps and a plurality of logic-high filters that each have the distinct number of taps. Specifically, the bi-phase modulation decoder 150 includes a 9-tap logic-low filter 152, a 9-tap logic-high filter 154, a 10-tap logic-low filter 156, a 10-tap logic-high filter 158, an 11-tap logic-low filter 160, and an 11-tap logic-high filter 162. As an example, the filters 152 through 162 can be configured as FIR filters. In the example of FIG. 4, the digital samples of the bi-phase modulated signal BI-Φ_IN are provided to a buffer 164 that buffers 11 digital samples of the bi-phase modulated signal BI-Φ_IN at a time. The digital samples are then provided from the buffer to all of the filters 152 through 162, such that for a given bit-window of the bi-phase modulated signal BI-Φ_IN, the filters 152 through 162 each generate a dot product of digital samples of the bi-phase modulated signal BI-Φ_IN and a respective plurality of tap weights of the filters 152 through 162.

Similar to the logic-low filter 12 in the example of FIG. 1, each of the logic-low filters 152, 156, and 160 can be programmed with a range of values that can be plotted as an approximate half sine wave across 9, 10, and 11 taps, respectively, similar to as demonstrated in the example of FIG. 2. In addition, similar to the logic-low filter 14 in the example of FIG. 1, each of the logic-high filters 154, 158, and 162 can be programmed with a range of values that can be plotted as an approximate sine wave across 9, 10, and 11 taps, respectively, similar to as demonstrated in the example of FIG. 3. Furthermore, the tap weights of the filters 152 through 162 can all be normalized with respect to each other, such that all six of the filters 152 through 162 yield appropriately comparable dot products. Specifically, the normalization of the tap weights of the filters 152 through 162 can be such that the absolute value dot products can be comparable such that they do not provide an inherent advantage with respect to a sine wave plot versus half sine wave plot, or with respect to the number of taps of the respective filters 152 through 162. As an example, the tap weights in the 9-tap filters 152 and 154 can be greater than the tap weights in the 10-tap filters 156 and 158 and tap weights in the 11-tap filters 160 and 162 can be less than the tap weights in the 10-tap filters 156 and 158 based on the varying number of terms in the absolute value dot products. The bi-phase modulation decoder 150 thus also includes a comparator 166, which compares an absolute value magnitude of each of the dot products to determine if the given bit-window of the bi-phase modulated signal BI-Φ_IN corresponds to a logic-low code or a logic-high code. The comparator 166 thus outputs the output signal CODE_OUT as either a logic-low or a logic-high based on the comparison.

Ideally, the frequency of the bi-phase modulation signal BI-Φ_IN and the sampling frequency of the associated ADC (not shown) that provides the digital samples of the bi-phase modulated signal BI-Φ_IN are aligned. Therefore, the bi-phase modulation decoder 150 can appropriately anticipate a set number of digital samples to correspond to one bit-window of the bi-phase modulation signal BI-Φ_IN. However, the associated communication system may not include an external clock to align the frequencies of the bi-phase modulated signal BI-Φ_IN and the sampling frequency of the ADC. Thus, frequency variation and/or jitter can be introduced into the associated communication system from any of a variety of factors. Therefore, the number of samples that can correspond to a given bit-window of the bi-phase modulation signal BI-Φ_IN may vary based on the frequency variation and/or jitter. Specifically, a frequency of the bi-phase modulation signal BI-Φ_IN that is greater than the expected frequency can result in a number of digital samples that is less than the expected number of samples for a given bit-window. Similarly, a frequency of the bi-phase modulation signal BI-Φ_IN that is less than the expected frequency can result in a number of digital samples that is greater than the expected number of samples.

In the example of FIG. 4, the bi-phase modulated signal BI-Φ_IN can have a frequency of 2 kHz and can be sampled at a frequency of 20kHz by the ADC. Thus, it is expected that the bi-phase modulation decoder 150 receives ten digital samples of the bi-phase modulated signal BI-Φ_IN corresponding to a single bit-window, and thus an encoded logic state. Thus, the 10-tap logic-low and logic-high filters 156 and 158 have a number of taps equal to the expected number of digital samples for a given bit-window of the bi-phase modulated signal BI-Φ_IN. However, frequency variation and/or jitter resulting in a frequency greater than 2 kHz can result in each bit-window of the bi-phase modulated signal BI-Φ_IN having 9 digital samples or resulting in a frequency less than 2 kHz can result in each bit-window of the bi-phase modulated signal BI-Φ_IN having 11 digital samples. Therefore, the 9-tap logic-low and logic-high filters 152 and 156 and the 11-tap logic-low and logic-high filters 160 and 162 have a number of taps corresponding to 9 and 11 digital samples, respectively, for a given bit-window of the bi-phase modulated signal BI-Φ_IN based on the frequency variation and/or jitter.

The 9-tap logic-low and logic-high filters 152 and 154 each generate a dot product of the first 9 digital samples provided from the buffer 164 with 9 respective tap weights. The 10-tap logic-low and logic-high filters 156 and 158 each generate a dot product of the first 10 digital samples provided from the buffer 164 with 10 respective tap weights. The 11-tap logic-low and logic-high filters 160 and 162 each generate a dot product of all 11 digital samples provided from the buffer 164 with 11 respective tap weights. The comparator 166 thus not only determines the encoded logic state of the bit-window of the bi-phase modulated signal BI-Φ_IN based on the greatest absolute value of the respective six dot products, but also determines the size of the given bit-window. Specifically, the greatest absolute value magnitude dot product is also determinative of the number of digital samples that constituted the bit-window of the bi-phase modulated signal BI-Φ_IN based on which of the six filters 152 through 162 generated the greatest magnitude absolute value dot product. Accordingly, the bi-phase modulation decoder 150 can accurately decode the bi-phase modulated signal BI-Φ_IN without an external clock that accounts for frequency variation and/or jitter.

As an example, if the comparator 166 determines that the bit-window had a length of less than the eleven digital samples output from the buffer 164, then the comparator 166 identifies that the last one or two digital samples of the eleven digital samples output from the buffer 164 thus correspond to the next bit-window of the bi-phase modulated signal BI- Φ_IN. For example, upon determining that the absolute value dot product of the 9-tap logic-high filter 154 is the highest, the comparator determines that the bit-window of the encoded logic-high is 9 digital samples long. Therefore, the remaining two digital samples of the 11 samples output from the buffer 164 correspond to the first two digital samples of the next bit-window of the bi-phase modulated signal BI-Φ_IN. As a result, the buffer 164 can be commanded by the comparator 166 to collect only the next nine samples of the bi-phase modulated signal BI-Φ_IN to provide a next set of eleven samples to the filters 152 through 162 for decoding the next bit-window.

In the example of FIG. 4, the comparator 166 includes a pattern detector 168. As an example, the pattern detector 168 can be configured as an algorithm that detects patterns in the number of digital samples that correspond to each decoded bit-window of the bi-phase modulated signal BI-Φ_IN. Thus, upon determining a given pattern, the pattern detector 168 can instruct the comparator 166 to only evaluate the relevant logic-low and logic-high pair of the filters 152 through 162 for each subsequent bit-window. For example, the pattern detector 168 could determine that the bi-phase modulated signal BI-Φ_IN has an average bit length of approximately 9.75 digital samples based on a recurring pattern of 9, 10, 10, and 10 digital samples. Therefore, the pattern detector 168, upon determining this pattern, can instruct the comparator 166 to evaluate only the 9-tap logic-low and logic-high filters 152 and 154 every fourth bit-window, and to evaluate only the 10-bit logic-low and logic-high filters 156 and 158 the remaining bit windows. As a result, the bi-phase modulation decoder 150 can reduce a number of machine instructions upon detecting a bit-window length pattern.

It is to be understood that the bi-phase modulation decoder 150 is not intended to be limited to the example of FIG. 4. For example, similar to the bi-phase modulation decoder 10 in the example of FIG. 1, the bi-phase modulation decoder 10 can be implemented as software or a combination of hardware and software. In addition, the bi-phase modulation decoder 150 is not limited to the six filters 152 through 162, but can include more or less filters based on the range of frequency variation and/or machine instructions per second (MIPS) constraints. As an example, the bi-phase modulation decoder 150 can include ten filters ranging in tap size from eight taps to twelve taps to account for a wider variation in frequency variation. As another example, the bi-phase modulation decoder 150 can include four filters having a programmable number of taps. Thus, upon the bi-phase modulation decoder 150 detecting an average number of digital samples corresponding to the size of the bit-window, such as via a zero-crossing algorithm on a preamble of the bi-phase modulated signal BI-Φ_IN, the four filters can be programmed with the appropriate number of taps (e.g., 9 and 10 taps, respectively, for a 9.75 average sample length bit-window) for decoding the bi-phase modulated signal BI-Φ_IN. Accordingly, the bi-phase modulation decoder 150 can be configured in any of a variety of ways.

FIG. 5 illustrates an example of a wireless power system 200 in accordance with an aspect of the invention. The wireless power system 200 includes a wireless charger 202 and a portable electronic device 204. As an example the portable electronic device 204 can be a wireless communication device. In the example of FIG. 5, the wireless charger 202 includes a current supply 206 that generates a current $I_1$ through an inductor $L_1$ and a resistor $R_1$. The portable electronic device 204 includes an inductor $L_2$ through which a current $I_2$ is induced to flow through a resistor $R_2$ based on the magnetic field generated through the inductor $L_1$. Therefore, the inductor $L_1$ in the wireless charger 202 and the inductor $L_2$ in the portable electronic device 204 collectively form a transformer 208. As a result, a voltage $V_{CHG}$ is provided to the portable electronic device 204 to power the portable electronic device 204 and/or charge a battery (not shown) within the portable electronic device 204.

As an example, it may be necessary or desirable for the portable electronic device 204 to communicate with the wireless charger 202. As an example, the portable electronic device 204 may provide messages to the wireless charger 202 to indicate that it is receiving power from the wireless charger 202, to indicate that it is fully charged, or to provide any of a variety of other indications. In the example of FIG. 5, the portable electronic device 204 includes a bi-phase modulation transmitter 210 that is coupled to a switch $S_2$. The bi-phase modulation transmitter 210 can thus open and close the switch $S_2$ to modulate a bi-phase modulation signal into the current $I_2$, such that the opening and closing of the switch provides logic-low and logic-high states, respectively, of the current $I_2$. Because power in the wireless power system 200 is conserved, the bi-phase modulation signal that is modulated onto the current $I_2$ is likewise modulated onto the current $I_1$ through the inductive coupling of the transformer 208.

The wireless charger 202 includes a receiver 212 that is coupled to the current path of the current supply 206, the inductor $L_1$, and the resistor $R_1$. The receiver 212 is thus configured to monitor the primary current $I_1$, and thus to demodulate the bi-phase modulated signal from the primary current $I_1$. As an example, the receiver 212 can monitor a voltage, power, or the primary current $I_1$ itself to demodulate the bi-phase modulated signal. Specifically, the receiver 212 includes an ADC 214 that is configured to generate digital samples at a substantially constant frequency corresponding to the magnitude of the primary current $I_1$ or an associated voltage or power, and thus the bi-phase modulated signal. The receiver 212 also includes a bi-phase modulation decoder 216. As an example, the bi-phase modulation decoder 216 can be configured substantially similar to the bi-phase modulation decoder 10 in the example of FIG. 1 or the bi-phase modulation decoder 150 in the example of FIG. 4. Therefore, the bi-phase modulation decoder 216 is configured to decode the digital samples of the current $I_1$ generated from the ADC 214 and to generate an output signal CODE_OUT.

It is to be understood that the wireless power system 200 is not intended to be limited to the example of FIG. 5. Specifically, the wireless power system 200 is demonstrated simplistically, such that a variety of additional circuit and/or communication components have been omitted from the example of FIG. 5. As an example, the circuits through which the currents $I_1$ and $I_2$ flow can include any of a variety of additional circuit components, such as arrangements of resistors and/or capacitors for providing the voltage $V_{CHG}$. As another example, the bi-phase modulation transmitter 210 can be provided commands from or can be configured as part of a processor (not shown). Furthermore, the wireless power system 200 can include any of a variety of additional devices for providing and/or receiving power, such as additional portable electronic devices being inductively coupled to additional inductors. Accordingly, the wireless power system 200 can be configured in any of a variety of ways.

Figure 6:
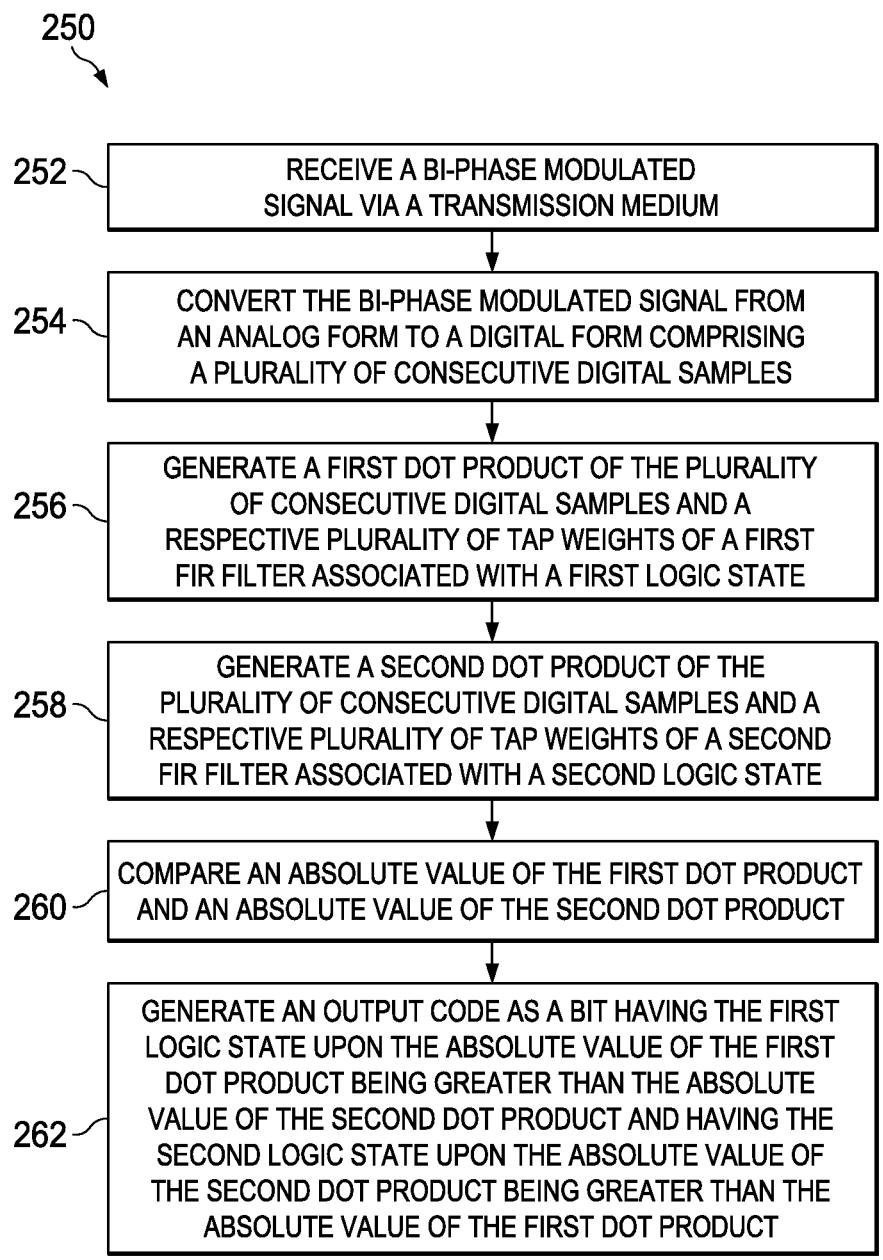
FIG. 6 illustrates an example of a method for decoding a bi-phase modulated signal in accordance with an aspect of the invention.

In view of the foregoing structural and functional features described above, a methodology in accordance with various aspects of the present invention will be better appreciated with reference to FIG. 6. While, for purposes of simplicity of explanation, the methodology of FIG. 6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 6 illustrates an example of a method 250 for decoding a bi-phase modulated signal in accordance with an aspect of the invention. At 252, the bi-phase modulated signal is received via a transmission medium. The transmission medium could be a wireless medium or a wired medium, such as a current flow through a primary inductor of a transformer in a wireless power system. At 254, the bi-phase modulated signal is converted from an analog form to a digital form comprising a plurality of consecutive digital samples. The conversion can result from an ADC having a sampling rate that is higher than a frequency of the bi-phase modulated signal, thus resulting in an expected number of digital samples per bit-window.

At 256, a first dot product of the plurality of consecutive digital samples and a respective plurality of tap weights of a first finite impulse response filter associated with a first logic state is generated. The tap weights can be arranged such that they can be plotted as an approximate half sine wave across the taps, with all tap weights being greater than or equal to a reference value (e.g., zero). At 258, a second dot product of the plurality of consecutive digital samples and a respective plurality of tap weights of a second finite impulse response filter associated with a second logic state is generated. The tap weights can be arranged such that they can be plotted as an approximate sine wave across the taps, with a first portion of consecutive taps having tap weights greater than the reference value and a second portion of consecutive taps having tap weights less than the reference value. The first and second filters could be first and second pluralities of filters, with each filter having a distinct number of taps in each plurality.

At 260, an absolute value of the first dot product and an absolute value of the second dot product are compared. At 262, an output code is generated as a bit having the first logic state upon an absolute value of the first dot product being greater than an absolute value of the second dot product and having the second logic state upon the absolute value of the second dot product being greater than the absolute value of the first dot product. The determination of the greatest absolute value dot product could also provide an indication of a size of a bit-window based on frequency variation and/or jitter.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A decoder system that decodes a bi-phase modulated signal, wherein each bit-window of the bi-phase modulated signal represents a single logic bit with each bit-window beginning with a logic transition, having a first logic state represented by substantially constant logic state through the bit-window and a second logic state represented by additional logic state transition in the approximate center of the bit-window, to generate an output code, the decoder system comprising: a first finite impulse response (FIR) filter associated with the first logic state configured to generate a first statistical value of a plurality of consecutive digital samples of the bi-phase modulated signal relative to a respective plurality of tap weights of the first FIR filter; a second FIR filter associated with the second logic state configured to generate a second statistical value of the plurality of consecutive digital samples of the bi-phase modulated signal relative to a respective plurality of tap weights of the second FIR filter; and a comparator connected to receive signals representative of the first and second statistical values and configured to compare the first and second statistical values and to provide the output code as a bit having one of the first logic state and the second logic state based on the comparison, wherein the plurality of tap weights of the first FIR filter comprises a range of values that are greater than or equal to a reference value, and wherein the plurality of tap weights of the second FIR filter comprises a first range of values corresponding to a first portion of the plurality of consecutive digital samples of the bi-phase modulated signal that are greater than the reference value and a second range of values corresponding to a second portion of the plurality of consecutive digital samples of the bi-phase modulated signal that are less than the reference value, the plurality of tap weights of each of the first and second FIR filters being normalized.

2. The system of claim 1, wherein the first statistical value is a first dot product and the second statistical value is a second dot product, and wherein the comparator is configured to output the bit as the first logic state upon an absolute value of the first dot product being greater than an absolute value of the second dot product and to output the bit as the second logic state upon the absolute value of the second dot product being greater than the absolute value of the first dot product.

3. The system of claim 1, wherein the range of values of the plurality of tap weights of the first FIR filter are arranged as an approximate half sine wave across a corresponding plurality of taps of the first FIR filter, and wherein the range of values of the plurality of tap weights of the second FIR filter are arranged as an approximate sine wave across a corresponding plurality of taps of the second FIR filter.

4. The system of claim 1, wherein the first FIR filter comprises a first plurality of filters associated with the first logic state, each of the first plurality of filters comprising a distinct number of taps, and wherein the second FIR filter comprises a second plurality of filters associated with the second logic state, each of the second plurality of filters comprising a distinct number of taps corresponding respectively to the distinct number of taps of the first plurality of filters.

5. The system of claim 4, wherein the comparator is configured to compare the statistical values as dot products generated by each filter of the first and second pluralities of FIR filters to provide the output code as the bit having one of the first logic state and the second logic state based on the comparison.

6. The system of claim 5, wherein the comparator is further configured to identify a number of digital samples corresponding to each bit-window of the bi-phase modulated signal based on the comparison and to select a corresponding proper subset of filters from each of the first plurality of FIR filters and the second plurality of FIR filters for decoding subsequent bit-windows of the bi-phase modulated signal based on a pattern of the number of digital samples corresponding to each bit-window of the bi-phase modulated signal.

7. The system of claim 1, wherein each of the first and second FIR filters comprises N taps, where N is a positive integer corresponding to a respective N expected digital samples per bit-window of the bi-phase modulated signal, the system further comprising: a third FIR filter associated with the first logic state and configured to generate a third statistical value of N+1 consecutive digital samples of the bi-phase modulated signal relative to N+1 tap weights of the third FIR filter; and a fourth FIR filter associated with the first logic state and configured to generate a fourth statistical value of N−1 digital samples of the bi-phase modulated signal relative to N−1 tap weights of the fourth FIR filter; a fifth FIR filter associated with the second logic state and configured to generate a fifth statistical value of N+1 consecutive digital samples of the bi-phase modulated signal relative to N+1 tap weights of the fifth FIR filter; and a sixth FIR filter associated with the second logic state and configured to generate a sixth statistical value of N−1 of consecutive digital samples of the bi-phase modulated signal relative to N−1 tap weights of the sixth FIR filter; wherein the comparator is configured to compare a magnitude of the first through sixth statistical values to provide the output code as the bit having one of the first logic state and the second logic state based on the comparison.

8. A wireless power system comprising the decoder system of claim 1, the wireless power system comprising:
a wireless charger comprising a receiver configured to monitor a primary current associated with a primary inductor, the receiver comprising the decoder system of claim 1; and
a portable electronic device comprising a transmitter configured to modulate the bi-phase communication signal onto a secondary current associated with a secondary inductor, the primary inductor and secondary inductor collectively forming an isolation transformer configured to transfer energy from the primary inductor to the secondary inductor to generate a voltage in the portable electronic device.

9. The wireless power system of claim 8, the receiver further comprising an analog-to-digital converter (ADC) configured to convert a magnitude of one of a voltage, a power, and a current associated with the primary inductor into the plurality of consecutive digital samples of the bi-phase modulated signal.

10. A method for decoding a bi-phase modulated signal, wherein each bit-window of the bi-phase modulated signal represents a single logic bit with each bit-window beginning with a logic transition, having a first logic state represented by substantially constant logic state through the bit-window and a second logic state represented by additional logic state transition in the approximate center of the bit-window, the method comprising: receiving the bi-phase modulated signal via a transmission medium; converting the bi-phase modulated signal from an analog form to a digital form comprising a plurality of consecutive digital samples; generating a first dot product of the plurality of consecutive digital samples and a respective plurality of tap weights of a first finite impulse response (FIR) filter associated with the first logic state; generating a second dot product of the plurality of consecutive digital samples and a respective plurality of tap weights of a second FIR filter associated with the second logic state; comparing an absolute value of the first dot product and an absolute value of the second dot product in a comparator receiving the first and second dot products; generating an output code as a bit having the first logic state upon the absolute value of the first dot product being greater than the absolute value of the second dot product and having the second logic state upon the absolute value of the second dot product being greater than the absolute value of the first dot product; and programming the plurality of tap weights of the first filter to have a range of values that are greater than or equal to a reference value; programming the plurality of tap weights of the second filter to have a first range of values corresponding to consecutive digital samples of the bi-phase modulated signal that are greater than the reference value and a second range of values corresponding to consecutive digital samples of the bi-phase modulated signal that are less than the reference value; and normalizing the plurality of tap weights of each of the first and second FIR filters.

11. The method of claim 10, wherein programming the plurality of tap weights of the first FIR filter comprises programming the range of values of the plurality of tap weights of the first FIR filter as an approximate half sine wave across a corresponding plurality of taps of the first FIR filter, and wherein programming the plurality of tap weights of the second FIR filter comprises programming the range of values of the plurality of tap weights of the second FIR filter as an approximate sine wave across a corresponding plurality of taps of the second FIR filter.

12. The method of claim 10, wherein the first FIR filter comprises a first plurality of filters associated with the first logic state, each of the first plurality of filters comprising a distinct number of taps, and wherein the second FIR filter comprises a second plurality of filters associated with the second logic state, each of the second plurality of filters comprising a distinct number of taps corresponding respectively to the distinct number of taps of the first plurality of filters.

13. The method of claim 10, wherein each of the first and second FIR filters comprises N taps, where N is a positive integer corresponding to a respective N expected digital samples per bit-window of the bi-phase modulated signal, the method further comprising: generating a third dot product of N+1 consecutive digital samples of the bi-phase modulated signal and N+1 tap weights of a third finite impulse response filter associated with the first logic state; generating a fourth dot product of N−1 consecutive digital samples of the bi-phase modulated signal and N−1 tap weights of a fourth finite impulse response filter associated with the first logic state; generating a fifth dot product of N+1 consecutive digital samples of the bi-phase modulated signal and N+1 tap weights of a fifth finite impulse response filter associated with the second logic state; and generating a sixth dot product of N−1 consecutive digital samples of the bi-phase modulated signal and N−1 tap weights of a sixth finite impulse response filter associated with the second logic state; wherein comparing the magnitude comprises comparing a magnitude of an absolute value of the first through sixth dot products.

14. The method of claim 13, further comprising:
identifying a number of received digital samples corresponding to each bit-window of the bi-phase modulated signal based on the comparison; and
selecting a proper subset of the first, third, and fourth finite impulse response filters and a proper subset of the second, fifth, and sixth finite impulse response filters for decoding subsequent bit-windows of the bi-phase modulated signal based on a pattern of the number of received digital samples corresponding to each bit-window of the bi-phase modulated signal.

15. A wireless power system comprising: a portable electronic device comprising a transmitter configured to modulate a bi-phase communication signal, wherein each bit-window of the bi-phase modulated signal represents a single logic bit with each bit-window beginning with a logic transition, having a first logic state represented by substantially constant logic state through the bit-window and a second logic state represented by additional logic state transition in the approximate center of the bit-window, onto a secondary current associated with a secondary inductor; a wireless charger comprising a receiver configured to monitor a primary current associated with a primary inductor, the primary inductor and secondary inductor collectively forming an isolation transformer configured to transfer energy from the primary inductor to the secondary inductor to charge a rechargeable battery in the portable electronic device, the receiver comprising a decoder comprising: at least one first finite impulse response (FIR) filter associated with the first logic state that are each configured to generate a first dot product of a plurality of consecutive digital samples of the bi-phase modulated signal associated with the primary current and tap weights associated with a distinct plurality of taps associated with each respective one of the at least one first FIR filter; at least one second FIR filter associated with the second logic state that are each configured to generate a second dot product of the plurality of consecutive digital samples of the bi-phase modulated signal associated with the primary current and tap weights associated with a distinct plurality of taps associated with each respective one of the at least one second FIR filter; a comparator connected to receive the first and second dot products and configured to compare the dot products associated with each of the at least one first FIR filter and the at least one second FIR filter to provide the output code as a bit having one of the first logic state and the second logic state based on the comparison, wherein the tap weights of the at least one first FIR filter comprises a range of values that are greater than or equal to a reference value, and wherein the tap weights of the at least one second FIR filter comprises a first range of values corresponding to a first portion of a plurality of consecutive digital samples of the bi-phase modulated signal that are greater than the reference value and a second range of values corresponding to a second portion of the plurality of consecutive digital samples of the bi-phase modulated signal that are less than the reference value, the tap weights of each of the at least one first and the at least one second FIR filters being normalized.

16. The wireless power system of claim 15, the receiver further comprising an analog-to-digital converter (ADC) configured to convert a magnitude of the primary current into the plurality of consecutive digital samples of the bi-phase modulated signal.

17. The wireless power system of claim 15, wherein the at least one first FIR filter comprises a first plurality of filters associated with the first logic state and the at least one second FIR filter comprises a second plurality of filters associated with the second logic state, and wherein the comparator is further configured to identify a number of digital samples corresponding to each bit-window of the bi-phase modulated signal based on the comparison and to select a proper subset of each of the first plurality of filters and the second plurality of filters for decoding subsequent bit-windows of the bi-phase modulated signal based on a pattern of the number of digital samples corresponding to each bit-window of the bi-phase modulated signal.

* * * * *